US008505495B2

(12) United States Patent
Wang

(10) Patent No.: US 8,505,495 B2

(45) Date of Patent: Aug. 13, 2013

(54) LEASH

(76) Inventor: Po-Wen Wang, Taoyuan (TW)

( * ) Notice: Subject to any disclaimer, the term of this patent is extended or adjusted under 35 U.S.C. 154(b) by 49 days.

(21) Appl. No.: 13/207,711

(22) Filed: Aug. 11, 2011

(65) Prior Publication Data

US 2012/0037091 A1 Feb. 16, 2012

(30) Foreign Application Priority Data

Aug. 12, 2010 (TW) .............................. 99215509 U

(51) Int. Cl.
*A01K 27/00* (2006.01)

(52) U.S. Cl.
USPC .......................................................... 119/797

(58) Field of Classification Search
USPC ................. 119/769, 770, 771, 772, 795, 797, 119/802, 814, 818, 856, 857, 863, 865; D30/153
See application file for complete search history.

(56) References Cited

U.S. PATENT DOCUMENTS 509,882 A * 12/1893 Easton ............................ 54/36
950,470 A * 3/1910 Bellamy .......................... 54/34
2,356,715 A * 8/1944 Webster ........................ 119/776
2,861,547 A * 11/1958 Dale ............................ 119/797
3,752,127 A * 8/1973 Baker ........................... 119/797
5,146,876 A * 9/1992 McPhail ........................ 119/798
D381,473 S * 7/1997 Dixon et al. ................. D30/153
6,971,334 B1 * 12/2005 Livesay et al. ............... 119/798
7,096,827 B2 * 8/2006 Sporn ........................... 119/797
7,370,457 B2 * 5/2008 Roberts ............................ 54/36
8,267,050 B1 * 9/2012 Hatcher et al. ............... 119/797
2005/0000470 A1 1/2005 Fountoulakis
2011/0180015 A1 * 7/2011 Larson ......................... 119/792

* cited by examiner

*Primary Examiner* — Rob Swiatek
*Assistant Examiner* — Ebony Evans
(74) *Attorney, Agent, or Firm* — Ditthavong, Mori & Steiner, P.C.

(57) ABSTRACT

An approach is provided for a leash for leashing animals. The leash comprises a strap, an auxiliary loop, a handgrip loop and a snap buckle. The strap reeves a first snap hook at a first end of the leash, which forms an upper-layer belt and a lower-layer belt. The first snap hook is used for attaching to an animal's collar. The auxiliary loop is connected to the lower-layer belt at a second end of the leash and having a ring surrounded the upper-layer belt. The handgrip loop is connected to the upper-layer belt at the second end of the leash. The snap buckle is connected to the auxiliary loop and the handgrip loop, and is configured to release the lower-layer belt selectively toward the upper-layer belt through the first snap hook. Thus, the leash provides the advantage of positive control of the length in a simple fashion.

11 Claims, 5 Drawing Sheets

LEASH

FIELD OF THE INVENTION

Embodiments of the invention relate to a leash, especially to an adjustable leash that is extendable for leashing an animal.

BACKGROUND

With reference to FIG. 1A, FIG. 1A is an exemplary diagram of a conventional leash. A conventional leash has a strap 3, a handgrip loop 31 and a snap hook 32. The handgrip 31 is a loop fixed to an end of the strap 3. The snap hook 32 is fixed to another end of the strap, for attaching to animal's collar or harness. The leash as shown in the FIG. 1A cannot normally be adjusted. The length of the leash can be used either with a fully extended range or shortened by manually coiled around a person's hand.

With reference to FIG. 1B, FIG. 1B is an exemplary diagram of another conventional leash. Another conventional leash has been proposed that allows the length of the leash to be adjusted. Such known adjustable leash usually comprises, as shown in FIG. 1B, a strap 1, a first snap hook 11, a second snap hook 12 and a clasp 13. The first snap hook 11 is fixed to an end of the strap 1. The clasp 13 is mounted on the strap 1 adjacent to the first snap hook 11. The second snap hook 12 is fixed to another end of the strap 1, and can be folded and selectively attached to the clasp 13 to form a loop for shortening the leash. The second snap hook 12 can be also detached from the clasp 13 for elongating the leash. The loop can be used as a handgrip or a shoulder strap worn from one side of the shoulder to another side of the waist. Moreover, a stronger pulling force may damage in vertebra (i.e., vertebral column) of the person who worn the loop on the shoulder.

Although the leash of FIG. 1B is able to adjust the length easily, the leash contains some potential safety risks. The existing adjusting mechanism which did not provide adequate control of the animal by the leash. This could also lead to discomfort such as friction burns from the leash being pulled through the person's hands.

For example, the loop is disintegrated when the second snap hook 12 is detached from the clasp 13, the stress or sudden forces would be transferred to the point where the person is holding the leash. Such stress or sudden force may injure person's hand, especially when leashed to a large animal.

Therefore, there is a need for an approach to provide a mechanism that can adapt to an adjustable leash for attaching to an animal with smoothly ways for adjusting the length of the strap.

SOME EXEMPLARY EMBODIMENTS

These and other needs are addressed by the invention, wherein an approach is provided for selectively shortening and elongating an adjustable leash for leashing animals with a greater or lesser clearance.

According to one aspect of an embodiment of the invention, a leash comprises a strap, an auxiliary loop, a handgrip loop and a snap buckle. The strap reeves a first snap hook at a first end of the leash, which forms an upper-layer belt and a lower-layer belt. The first snap hook is used for attaching to an animal's collar. The auxiliary loop is connected to the lower-layer belt at a second end of the leash and having a middle ring surrounded the upper-layer belt. The handgrip loop is connected to the upper-layer belt at the second end of the leash. The snap buckle is connected to the auxiliary loop and the handgrip loop, and comprises a receiving ring and a second snap hook. The receiving ring is disposed at the auxiliary loop adjacent to the middle ring and surrounds the upper-layer belt. The second snap hook is attached to the receiving ring for selectively releasing the lower-layer belt toward the upper-layer belt through the first snap hook.

Accordingly, the leash in accordance with embodiments of the present invention provides a smoothly releasing mechanism by letting the lower-layer belt toward the upper-layer belt through the first snap hook when the second snap hook is detached from the receiving ring. Such smoothly releasing mechanism provides more safety, convenience and comfort use that satisfies all requirements for leashing animals, in particular dogs, with a greater or lesser clearance.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

Figure 2:
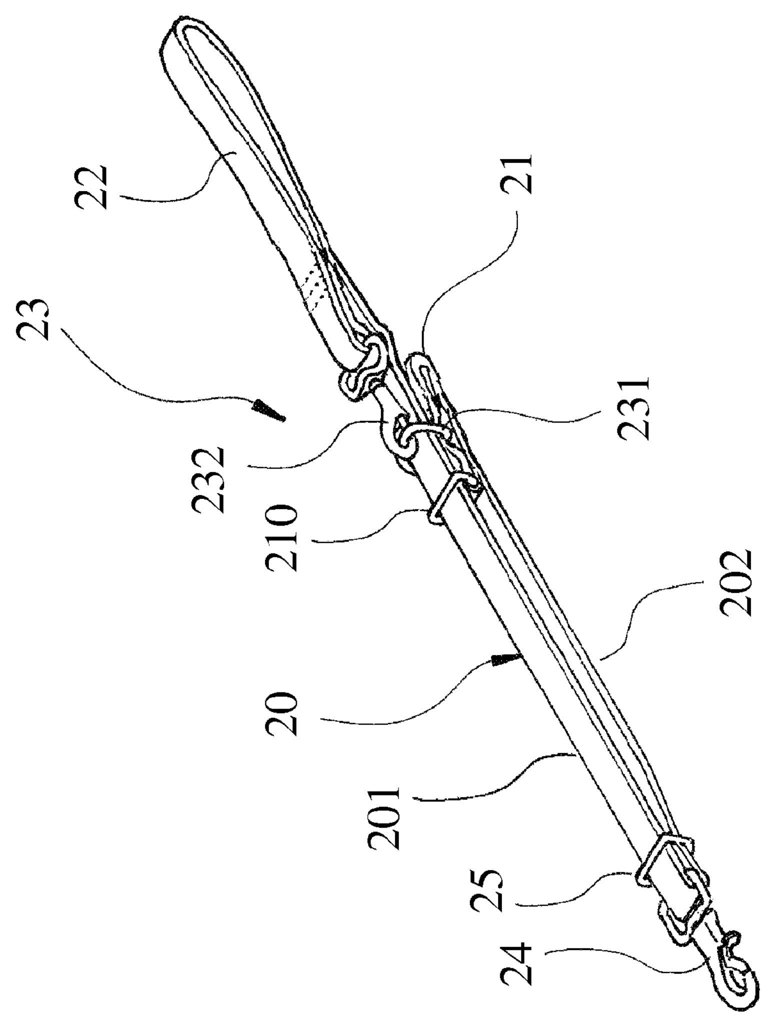
FIG. 2 is an exemplary diagram of a leash in accordance with the present invention.
Figure 3:
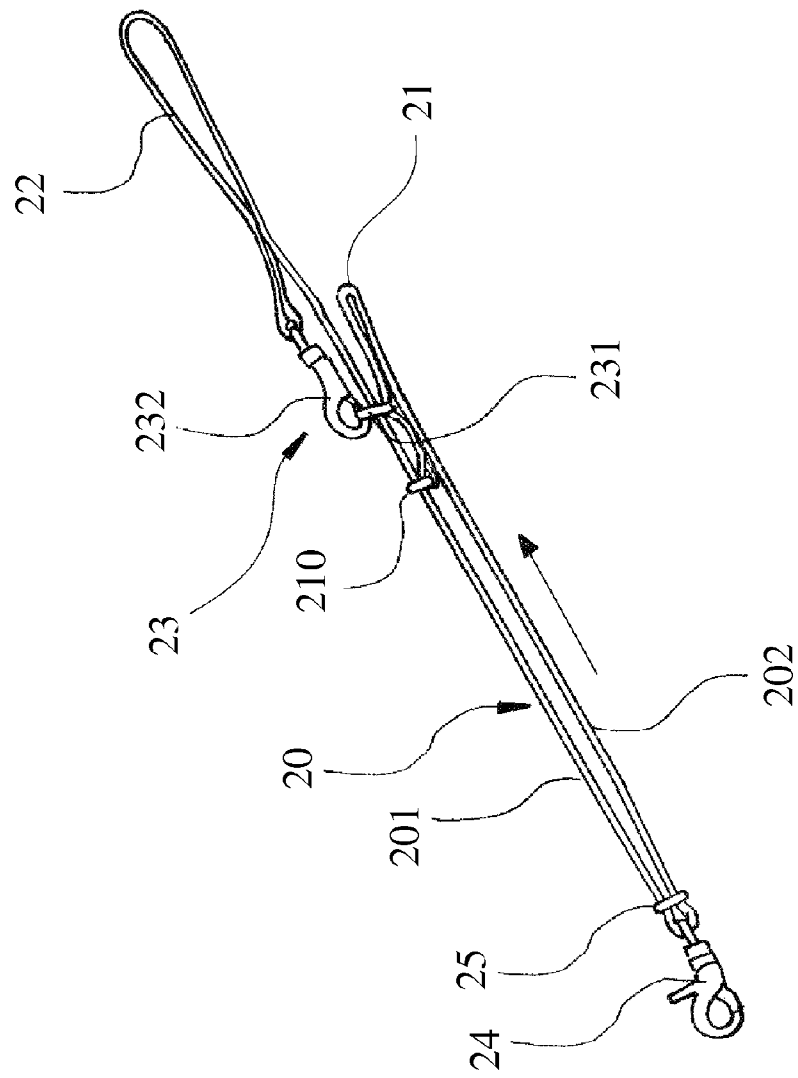
FIG. 3 is an exemplary diagram of the leash of FIG. 2 when the second snap hook is attached to the receiving ring.
Figure 4:
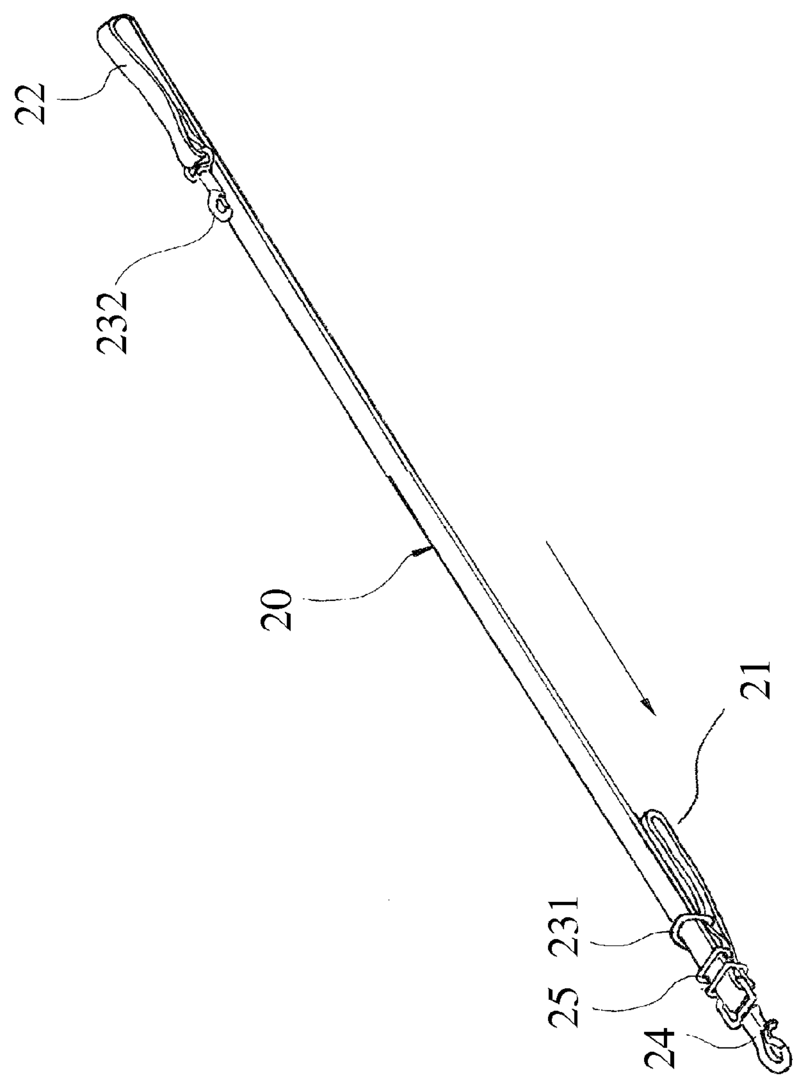
FIG. 4 is an exemplary diagram of the leash of FIG. 2 when the second snap hook is detached from the receiving ring.

With reference to FIGS. 2-4, FIG. 2 is an exemplary diagram of a adjustable leash in accordance with the present invention. FIG. 3 is an exemplary diagram of the leash of FIG. 2 when the second snap hook is attached to the receiving ring. FIG. 4 is an exemplary diagram of the leash of FIG. 2 when the second snap hook is detached from the receiving ring.

A leash comprises a strap 20, an auxiliary loop 21, a handgrip loop 22 and a snap buckle 23. The strap 20 is a one-piece made belt and reeves a first snap hook 24 at a first end of the leash, which forms an upper-layer belt 201 and a lower-layer belt 202. The first snap hook 24 is used for attaching to an animal's collar (not shown).

In this example, as shown in FIG. 2, the upper-layer belt 201 and the lower-layer belt 202 are overlapped with approximately equally width and length. However, one of ordinary skill in the art would recognize that the upper-layer belt 201 and the lower-layer belt 202 of the strap 20 can be made with different width, length and materials.

The auxiliary loop 21 is connected to the lower-layer belt 202 at a second end of the leash, and comprises a ring 210 surrounded the upper-layer belt 201. In this example, as shown in FIG. 3, the auxiliary loop 21 is a retaining loop formed by folding an external portion of the strap 20 protruded from the lower-layer belt 202 at the second end of the leash. The folded external portion can further be folded again to form a tunnel, as shown clearly in FIG. 3, for connecting the ring 210 to the auxiliary loop 21. The external portion protruded from the lower-layer 202 is one-piece made belt that integrated with the strap 20.

The auxiliary loop 21 is connected to the lower-layer belt 202 at a second end of the leash, and comprises a middle ring 210 surrounded the upper-layer belt 201. In this example, as shown in FIG. 3, the auxiliary loop 21 is a retaining loop formed by folding an external portion of the strap 20 protruded from the lower-layer belt 202 at the second end of the leash. The folded external portion can further be folded again to form a tunnel, as shown clearly in FIG. 3, for connecting the middle ring 210 to the auxiliary loop 21. The external portion protruded from the lower-layer 202 is one-piece made belt that integrated with the strap 20.

The handgrip loop 22 is connected to the upper-layer belt 201 at the second end of the leash. As shown in FIG. 2, the handgrip loop 22 is also a retaining loop formed by folding an external portion of the strap 20 protruded from the upper-layer belt 201 at the second end of the leash. The external portion protruded from the upper-layer 201 is also one-piece made belt that integrated with the strap 20.

The snap buckle 23 is connected to the auxiliary loop 21 and the handgrip loop 22, and comprises a receiving ring 231 and a second snap hook 232. The receiving ring 231 is disposed at the auxiliary loop 21 adjacent to the middle ring 210 and surrounds the upper-layer belt 201. The second snap hook 232 is connected to the handgrip loop 22 and is configured to attach the receiving ring 231 for selectively releasing the lower-layer belt 202 toward the upper-layer belt 201 through the first snap hook 24. In other words, the first snap hook 24 provides a function of a pivot pole as the lower-layer belt 202 moving toward the upper-layer belt 201.

In additional, the folded external portion of handgrip loop 22 can further be folded again to form a tunnel, as shown clearly in FIG. 2, for connecting the second snap hook 232 to the handgrip loop 22. It is noted that the double folded external portions of the auxiliary loop 21 and the handgrip loop 22 are superior configurations that reducing manufacturing steps for connecting the middle ring 210 and the second snap hook 232 without any additional connecting assemblies, such as punching a hole with eyelet. Such manufacturing steps including punching holes or cutting belt known as a fracture manufacturing or a destructive process.

Figure 1A:
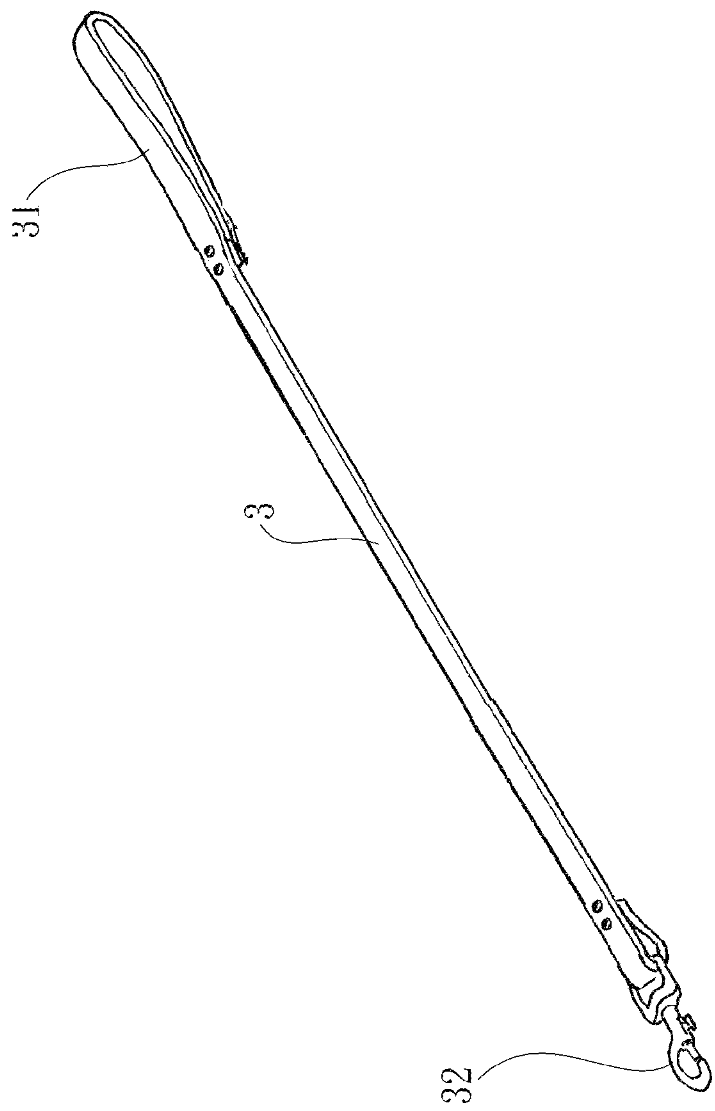
FIG. 1A is an exemplary diagram of a conventional leash.
Figure 1B:
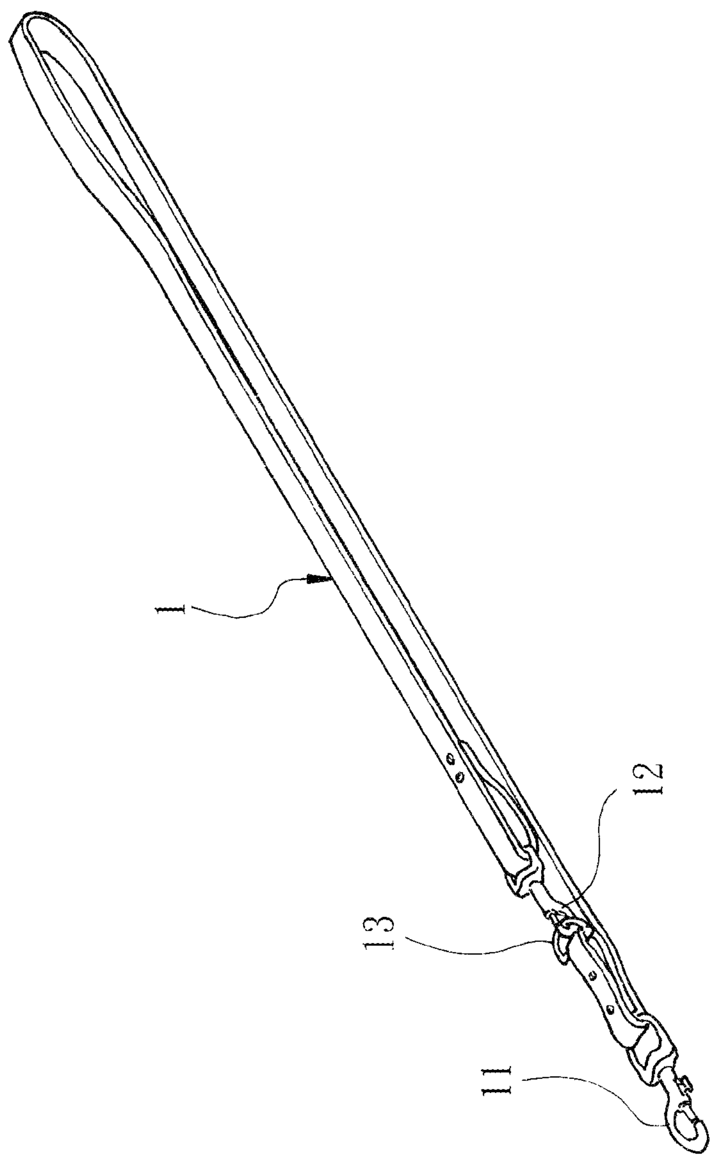
FIG. 1B is an exemplary diagram of another conventional leash.

In this manner, a person can feel safe, comfortable and convenience when using the leash of the embodiment of the present invention for leashing animals, in particular dogs, with a greater or lesser clearance. Comparing to the above mentioned conventional leash in FIG. 1B, the leash avoids sudden forces when the snap hook is released for adjusting the length of the leash.

With reference to FIGS. 3 and 4, the reason behind the configuration of making the ring 210 surrounded the upper-layer belt 201 is that when the second snap hook 232 is attached or detached from the receiving ring 231, the ring 210 is able to guide the lower-layer belt 202 and the upper-layer belt 201 and stops the auxiliary loop 21 at the first end of the leash.

With reference to FIGS. 3 and 4, the reason behind the configuration of making the ring 210 surrounded the upper-layer belt 201 is that when the second snap hook 232 is attached or detached from the receiving ring 231, the middle ring 210 is able to guide the lower-layer belt 202 and the upper-layer belt 201 and stops the auxiliary loop 21 at the first end of the leash.

With reference to FIGS. 2, 3 and 4, the leash further comprises at least one restraint ring 25 hooped around the upper-layer belt 201 and the lower-layer belt 202 of the strap 20. The restraint ring 25 is movably disposed between the first end and the second end of leash, and is configured to avoid the strap 20 becoming deformed (i.e., distortion or bend) during the length adjustment. The restraint ring 25 further provides a resistive force (i.e., inherent fraction contacted with strap 20) acted as a buffer that against and limit the movement of the upper-layer belt 201 and the lower-layer belt 202, which slows down the speed of the moving auxiliary loop 21 and achieves a more smooth adjusting mechanism.

For example, when the auxiliary loop 21 moving too fast to elongate the length of the strap, the upper-layer belt 201 and the lower-layer belt 202 will act like a fast operative conveyer belt. The operative conveyer belt generates a great force enough to drive the restraint ring 25 moving in a direction opposite to the auxiliary loop 21 to lean against the middle ring 210.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A leash comprising:

a strap reeving a first snap hook at a first end of the leash, which forms an upper-layer belt and a lower-layer belt, wherein the first snap hook is used for attaching to an animal's collar;

an auxiliary loop being connected to the lower-layer belt at a second end of the leash and having a middle ring surrounding the upper-layer belt;

a handgrip loop being connected to the upper-layer belt at the second end of the leash;

a snap buckle being connected to the auxiliary loop and the handgrip loop, and comprising a receiving ring being disposed at the auxiliary loop adjacent to the middle ring and surrounding the upper-layer belt; and a second snap hook being attached to the receiving ring for selectively releasing the lower-layer belt toward the upper-layer belt through the first snap hook.

2. The leash as claimed in claim 1, wherein the upper-layer belt and the lower-layer belt are overlapped with equally width and length.

3. The leash as claimed in claim 1, wherein the auxiliary loop is a retaining loop formed by an external portion of the strap folded and protruded from the lower-layer belt at the second end of the leash.

4. The leash as claimed in claim 3, wherein the auxiliary loop further has a tunnel for connecting the middle ring to the auxiliary loop.

5. The leash as claimed in claim 3, wherein the handgrip loop is a retaining loop formed by an external portion of the strap folded and protruded from the upper-layer belt at the second end of the leash.

6. The leash as claimed in claim 5, wherein the handgrip loop further has a tunnel for connecting the second snap hook to the handgrip loop.

7. The leash as claimed in claim 1, wherein the auxiliary loop is configured to slide to the first snap hook as the lower-layer belt toward the upper-layer belt through the first snap hook.

8. The leash as claimed in claim 1, further comprising at least one restraint ring hooped around the upper-layer belt and the lower-layer belt of the strap.

9. The leash as claimed in claim 8, wherein the at least one restraint ring is movably disposed between the first end and the second end of the leash, and is configured to avoid the strap becoming deformed.

10. The leash as claimed in claim 8, wherein the at least one restraint ring is configured to lean against the middle ring when the lower-layer belt moves toward the upper-layer belt through the first snap hook.

11. The leash as claimed in claim 1, wherein the strap is a one-piece made belt integrated with portions protruded from the upper-layer belt and lower-layer belt on the second side of the leash.

* * * * *